(12) United States Patent
Senior et al.

(10) Patent No.: US 12,458,758 B2
(45) Date of Patent: Nov. 4, 2025

(54) DRUG DELIVERY DEVICE AND ASSEMBLY METHOD FOR A DRUG DELIVERY DEVICE

(71) Applicant: Sanofi, Paris (FR)

(72) Inventors: James Alexander Senior, Warwick (GB); Harry Robert Lester, Warwick (GB); David Aubrey Plumptre, Warwick (GB); Robert Veasey, Warwick (GB)

(73) Assignee: Sanofi, Paris (FR)

( * ) Notice: Subject to any disclaimer, the term of this patent is extended or adjusted under 35 U.S.C. 154(b) by 1064 days.

(21) Appl. No.: 17/261,273

(22) PCT Filed: Jul. 15, 2019

(86) PCT No.: PCT/EP2019/068976
§ 371 (c)(1),
(2) Date: Jan. 19, 2021

(87) PCT Pub. No.: WO2020/020680
PCT Pub. Date: Jan. 30, 2020

(65) Prior Publication Data
US 2021/0346605 A1    Nov. 11, 2021

(30) Foreign Application Priority Data
Jul. 23, 2018   (EP) .................................. 18305999

(51) Int. Cl.
*A61M 5/315*   (2006.01)

(52) U.S. Cl.
CPC .... *A61M 5/31515* (2013.01); *A61M 5/31528* (2013.01); *A61M 5/31585* (2013.01); *A61M 2205/0216* (2013.01); *A61M 2207/00* (2013.01)

(58) Field of Classification Search
CPC .......... A61M 5/31515; A61M 5/31528; A61M 5/31585; A61M 2205/0216; A61M 2207/00
See application file for complete search history.

(56) References Cited

U.S. PATENT DOCUMENTS

| 8,900,202 B2 | 12/2014 | Helmer et al. |
| 2013/0023831 A1 | 1/2013 | Helmer et al. |
| 2016/0310674 A1* | 10/2016 | Törnsten ........... A61M 5/31505 |

FOREIGN PATENT DOCUMENTS

| CN | 106659853 | 5/2017 |
| CN | 106794313 | 5/2017 |

(Continued)

OTHER PUBLICATIONS

PCT International Preliminary Report on Patentability in International Application No. PCT/EP2019/068976, dated Jan. 26, 2021, 8 pages.

(Continued)

Primary Examiner — Dung T Ulsh
(74) Attorney, Agent, or Firm — Fish & Richardson P.C.

(57) ABSTRACT

A drug delivery device comprising a housing with an opening, a piston rod having a proximal end and a distal end, and a bearing. The piston rod is adapted to engage the opening for guiding the piston rod during a movement of the piston rod relative to the housing. The piston rod also includes a first attachment element located at the distal end. The bearing has a second attachment element for rotatable attachment of the bearing at the distal end of the piston rod. The first attachment element and/or the second attachment element is elastically deformable in a radial direction for snap engagement of the piston rod and the bearing. The opening is adapted to receive the first attachment element and the second attachment element if attached to each other (Continued)

but preventing disengagement of the first attachment element and the second attachment element if received in the opening.

18 Claims, 1 Drawing Sheet

(56) References Cited

FOREIGN PATENT DOCUMENTS

| | | |
|---|---|---|
| EP | 2600922 | 5/2014 |
| EP | 2437821 | 9/2017 |
| EP | 2437827 | 11/2017 |
| JP | 2013-507158 | 3/2013 |
| JP | 2013-528086 | 7/2013 |
| JP | 2017-520367 | 7/2017 |
| KR | 10-2011-0014577 A | 2/2011 |
| WO | WO 2011/042539 | 4/2011 |
| WO | WO 2011/154482 | 12/2011 |
| WO | WO 2012/017035 | 2/2012 |
| WO | WO 2013/178600 | 12/2013 |
| WO | WO 2014/029724 | 2/2014 |
| WO | WO 2014/139913 | 9/2014 |
| WO | WO 2016/001292 | 1/2016 |
| WO | WO 2016/055625 | 4/2016 |

OTHER PUBLICATIONS

PCT International Search Report and Written Opinion in International Application No. PCT/EP2019/068976, dated Sep. 6, 2019, 11 pages.

* cited by examiner

DRUG DELIVERY DEVICE AND ASSEMBLY METHOD FOR A DRUG DELIVERY DEVICE

CROSS-REFERENCE TO RELATED APPLICATIONS

The present application is the national stage entry of International Patent Application No. PCT/EP2019/068976, filed on Jul. 15, 2019, and claims priority to Application No. EP 18305999.7, filed on Jul. 23, 2018, the disclosures of which are incorporated herein by reference.

TECHNICAL FIELD

The present disclosure is generally directed to a drug delivery device, e.g. an injection device for selecting and dispensing a number of user variable doses of a medicament. The disclosure is further directed to an assembly method for a drug delivery device.

BACKGROUND

Pen type drug delivery devices have application where regular injection by persons without formal medical training occurs. This may be increasingly common among patients having diabetes where self-treatment enables such patients to conduct effective management of their disease. In practice, such a drug delivery device allows a user to individually select and dispense a number of user variable doses of a medicament. The present disclosure is further directed to so called fixed dose devices which only allow dispensing of a predefined dose without the possibility to increase or decrease the set dose.

There are basically two types of drug delivery devices: resettable devices (i.e., reusable) and non-resettable (i.e., disposable). For example, disposable pen delivery devices are supplied as self-contained devices. Such self-contained devices do not have removable pre-filled cartridges. Rather, the pre-filled cartridges may not be removed and replaced from these devices without destroying the device itself. Consequently, such disposable devices need not have a resettable dose setting mechanism. The present disclosure is applicable for both types of devices, i.e. for disposable devices as well as for reusable devices.

These types of pen delivery devices (so named because they often resemble an enlarged fountain pen) generally comprise three primary elements: a cartridge section that includes a cartridge often contained within a housing or holder; a needle assembly connected to one end of the cartridge section; and a dosing section connected to the other end of the cartridge section. A cartridge (often referred to as an ampoule) typically includes a reservoir that is filled with a medication (e.g., insulin), a movable rubber type bung or stopper located at one end of the cartridge reservoir, and a top having a pierceable rubber seal located at the other, often necked-down, end. A crimped annular metal band is typically used to hold the rubber seal in place. While the cartridge housing may be typically made of plastic, cartridge reservoirs have historically been made of glass.

The needle assembly is typically a replaceable double-ended needle assembly. Before an injection, a replaceable double-ended needle assembly is attached to one end of the cartridge assembly, a dose is set, and then the set dose is administered. Such removable needle assemblies may be threaded onto, or pushed (i.e., snapped) onto the pierceable seal end of the cartridge assembly.

The dosing section or dose setting mechanism is typically the portion of the pen device that is used to set (select) a dose. During an injection, a spindle or piston rod contained within the dose setting mechanism presses against the bung or stopper of the cartridge. This force causes the medication contained within the cartridge to be injected through an attached needle assembly. After an injection, as generally recommended by most drug delivery device and/or needle assembly manufacturers and suppliers, the needle assembly is removed and discarded.

A further differentiation of drug delivery device types refers to the drive mechanism: There are devices which are manually driven, e.g. by a user applying a force to an injection button, devices which are driven by a spring or the like and devices which combine these two concepts, i.e. spring assisted devices which still require a user to exert an injection force. The spring-type devices involve springs which are preloaded and springs which are loaded by the user during dose selecting. Some stored-energy devices use a combination of spring preload and additional energy provided by the user, for example during dose setting.

Known drug delivery devices typically comprise a housing with an opening and a piston rod having a proximal end and a distal end, wherein at least a portion of the piston rod is provided with an interface adapted to engage the opening for guiding the piston rod during a distal or proximal movement of the piston rod relative to the housing and at least one first attachment element located at the distal end. A bearing may be provided having at least one second attachment element for rotatable attachment of the bearing at the distal end of the piston rod. An example of a drug delivery devices comprising a pressure foot or bearing located at the distal end of the piston rod or spindle is shown in EP 2 437 821 B1, wherein the bearing is disposed to abut an end of the cartridge piston or bung.

EP 2 437 827 B1 discloses a spindle and bearing combination which comprises a rotatable spindle having a distal end and a disk-shaped bearing attached to the distal end of the spindle through a first connection comprising a web that fixedly attaches the bearing to the spindle to prevent independent movement of the bearing relative to the spindle. This first connection is replaced during assembly by a second connection that is created when the web is severed (sheared) and the web is disconnected from the bearing. The second connection is a rotating joint connection, i.e. one where the spindle can freely rotate.

Assembly of such drug delivery devices may include a first sequence of assembly steps for providing a mechanism sub assembly which may be subject to final assembly by combining the mechanism sub assembly with a cartridge. The final assembly may take place at a site remote from the site where the mechanism sub assembly is produced. This may involve transport and storage of mechanism sub assembly with the bearing and the piston rod.

In some drug delivery devices, the piston rod must be assembled from the proximal (button) end of the device through the, e.g. threaded, aperture in the housing. This necessitates the diameter of any snap connection features for the bearing to be less than the internal bore diameter of the thread form in the housing. This diameter is e.g. only 3 mm and this makes a robust snap connection more challenging to design.

The axial load from the piston rod during dispense must transfer to the bearing using a contact surface that is as close to a point contact as possible. This is to reduce the effects of friction when the piston rod spins during dispense relative to the bearing. This point contact should be on the axis of the device so that as the piston rod spins on this axis the point contact does not move off axis.

Further, the features that are used to connect the bearing to the piston rod should be moldable without adding any additional complication to the design of the molding tools that make these two parts. Essentially this means that the features must be moldable with simple open and shut tooling construction where possible and a maximum of two slides if necessary.

Once attached, it should be difficult to pull the bearing off the end of the piston rod. This is to ensure that during transportation of the mechanism sub assembly prior to final assembly, the bearing does not fall off. After final assembly of the disposable pen the bearing is trapped between the mechanism and the cartridge and hence the risk of falling off at this point is minimal. Also once partially dispensed, this bearing retention is not required as the bearing is then inside the cartridge and prevented from moving axially.

SUMMARY

The present disclosure is directed to a drug delivery device that comprises a bearing, preferably with a point contact with the piston rod, that is easy to assemble but is securely retained in the sub assembled condition prior to final assembly into the complete device.

In a drug delivery device according to the present disclosure, the at least one first attachment element and/or the at least one second attachment element is elastically deformable in a radial direction for snap engagement of the piston rod and the bearing. Further, the opening comprises at least one portion having a contour adapted to receive the at least one first attachment element and the at least one second attachment element if attached to each other. On the other hand, the contour of the opening is adapted to the attachment elements such that the opening prevents or at least impedes disengagement of the at least one first attachment element and the at least one second attachment element if received in the opening. For example, the portion of the opening may be adapted to receive or encase the first and second attachment elements with a clearance fit or an interference fit permitting axial movement of the bearing and the piston rod, preferably without friction due to contact with the interior of the opening. The clearance fit or interference may be chosen such that the elastic deformation of the attachment element(s) required for disengagement is blocked by the opening.

The present disclosure is based on the idea to attach the bearing to the piston rod, e.g. in a disposable pen injector, in such a way that the bearing is locked in position for transportation to reduce the risk of it falling off prior to final assembly. The present disclosure preferably relates to, but is not limited to, disposable pen type devices where good bearing retention is only required for the purposes of transportation of the mechanism prior to final assembly into a device.

A drug delivery device according to the present disclosure may have a design, where the piston rod may be directly operated by a user by puling, pushing and/or rotating the piston rod during use, e.g. for dose dispensing. As an alternative, the drug delivery device may further comprise at least a drive member operatively coupled to the piston rod for displacing the piston rod in the distal direction during dose dispensing and/or a dose setting member operatively coupled to the housing for selecting a dose.

In order to lock the bearing in position for transportation, during assembly of the drug delivery device, the piston rod may be axially movable between a distal mounting position in which the at least one first attachment element and the at least one second attachment element are located distally from the opening and a proximal transport position in which the at least one first attachment element and the at least one second attachment element are received in the opening. In other words, with the piston rod in the distal mounting position attachment of the bearing is possible by permitting radial widening of the respective attachment element(s) as the opening does not interfere with such widening. On the other hand, with the piston rod retracted in its proximal transport position the housing opening or the respective portion of the opening prevents widening of the respective attachment element(s) at least such that disengagement of the bearing from the piston rod is impeded, thereby locking the bearing on the piston rod.

In an example of the present disclosure the opening is provided with an internal thread wherein the interface adapted to engage the opening for guiding the piston rod during a distal or proximal movement of the piston rod relative to the housing comprises an external thread. In this case, the at least one portion having a contour adapted to receive the at least one first attachment element and the at least one second attachment element may comprise the internal thread. Thus, axial movement of the piston rod typically involves a combined rotation and displacement along a helical path. However, while the general engagement of the piston rod and the housing for dose dispensing may be in the form of a threaded interface, a pure axial displacement for a short distance, e.g. between the distal mounting position and the proximal transport position, may be permitted without rotation.

As an alternative, the opening is provided with a non-circular cross-section wherein the interface adapted to engage the opening for guiding the piston rod during a distal or proximal movement of the piston rod relative to the housing comprises a corresponding non-circular cross-section, e.g. in the form of a groove, a spline, a rib and/or a flattening. In this case, the at least one portion having a contour adapted to receive the at least one first attachment element and the at least one second attachment element may comprise a protrusion.

According to an example of the disclosure, the bearing may comprise a disc for abutting a bung of a cartridge and the at least one second attachment element of the bearing may comprise a spigot or stem extending proximally from the proximal side of the disc. The spigot may be provided with at least one radial recess permitting snap engagement with the piston rod. In this case, the at least one first attachment element of the piston rod may comprise at least one snap hook adapted to engage the at least one radial recess of the bearing. This design is similar to the design of existing products on the market which facilitates implementing this feature into production and assembly. In other words, in this configuration the bearing has a male spigot that attaches to female snap features on the piston rod. Equally however the piston rod could house the spigot and the bearing the snap features, e.g. at least one snap hook, although for low friction running the domed end of the spigot is preferably molded without a split line. The piston rod can be assembled either way around (end to end) and if molding a spigot with a domed end on both ends this would require two additional slides making the tooling for this part more complex with lower numbers of part cavities per tool, when compared to molding the dome on the bearing.

With respect to the present disclosure, the term housing is not limited to an outer body or shell of the device. Rather, the housing may be an internal housing component or an insert. Such an internal housing component or an insert may be a separate component part or may be a unitary portion of an outer body or shell of the device.

For a drug delivery device comprising at least a housing with an opening, a piston rod having a proximal end and a distal end and at least one first attachment element located at its distal end, and a bearing with at least one second attachment element for rotatable attachment of the bearing at the distal end of the piston rod, an assembly method according to the present disclosure comprises the steps of introducing the piston rod, e.g. in the distal direction, into the housing such that the distal end of the piston rod distally protrudes through the opening, thereafter attaching the bearing on the piston rod by snap engagement of the at least one first attachment element and the at least one second attachment element, and thereafter retracting the piston rod in the proximal direction until the at least one first attachment element and the at least one second attachment element are at least partially received in the opening of the housing. This retraction of the piston rod serves to lock the attachment elements, e.g. the snaps, from deflection radially outwards and therefore prevents the bearing from becoming detached without considerable force being applied.

The steps of introducing the piston rod in the distal direction into the housing and/or retracting the piston rod in the proximal direction may involve a combined rotation and translation of the piston rod, e.g. along a helical path. Further, the step of attaching the bearing on the piston rod may involve elastically deforming the at least one first attachment element and/or the at least one second attachment element in a radial direction.

The injection device typically comprises a cartridge containing a medicament. Thus, the assembly method may further comprise the step of attaching a cartridge holder containing a cartridge containing a medicament to the housing such that the bearing abuts a bung in the cartridge.

The term "medicament", as used herein, means a pharmaceutical formulation containing at least one pharmaceutically active compound,
  wherein in one embodiment the pharmaceutically active compound has a molecular weight up to 1500 Da and/or is a peptide, a protein, a polysaccharide, a vaccine, a DNA, a RNA, an enzyme, an antibody or a fragment thereof, a hormone or an oligonucleotide, or a mixture of the above-mentioned pharmaceutically active compound,
  wherein in a further embodiment the pharmaceutically active compound is useful for the treatment and/or prophylaxis of diabetes mellitus or complications associated with diabetes mellitus such as diabetic retinopathy, thromboembolism disorders such as deep vein or pulmonary thromboembolism, acute coronary syndrome (ACS), angina, myocardial infarction, cancer, macular degeneration, inflammation, hay fever, atherosclerosis and/or rheumatoid arthritis,
  wherein in a further embodiment the pharmaceutically active compound comprises at least one peptide for the treatment and/or prophylaxis of diabetes mellitus or complications associated with diabetes mellitus such as diabetic retinopathy,
  wherein in a further embodiment the pharmaceutically active compound comprises at least one human insulin or a human insulin analogue or derivative, glucagon-like peptide (GLP-1) or an analogue or derivative thereof, or exendin-3 or exendin-4 or an analogue or derivative of exendin-3 or exendin-4.

Insulin analogues are for example Gly(A21), Arg(B31), Arg(B32) human insulin; Lys(B3), Glu(B29) human insulin; Lys(B28), Pro(B29) human insulin; Asp(B28) human insulin; human insulin, wherein proline in position B28 is replaced by Asp, Lys, Leu, Val or Ala and wherein in position B29 Lys may be replaced by Pro; Ala (B26) human insulin; Des(B28-B30) human insulin; Des(B27) human insulin and Des(B30) human insulin.

Insulin derivates are for example B29-N-myristoyl-des (B30) human insulin; B29-N-palmitoyl-des (B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N-(N-palmitoyl-Y-glutamyl)-des (B30) human insulin; B29-N-(N-lithocholyl-Y-glutamyl)-des (B30) human insulin; B29-N-(ω-carboxyheptadecanoyl)-des (B30) human insulin and B29-N-(ω-carboxyheptadecanoyl) human insulin.

Exendin-4 for example means Exendin-4 (1-39), a peptide of the sequence H-His-Gly-Glu-Gly-Thr-Phe-Thr-Ser-Asp-Leu-Ser-Lys-Gln-Met-Glu-Glu-Glu-Ala-Val-Arg-Leu-Phe-Ile-Glu-Trp-Leu-Lys-Asn-Gly-Gly-Pro-Ser-Ser-Gly-Ala-Pro-Pro-Pro-Ser-NH2.

Exendin-4 derivatives are for example selected from the following list of compounds:
  H-(Lys)4-des Pro36, des Pro37 Exendin-4 (1-39)-NH2,
  H-(Lys)5-des Pro36, des Pro37 Exendin-4 (1-39)-NH2,
  des Pro36 Exendin-4 (1-39),
  des Pro36 [Asp28] Exendin-4 (1-39),
  des Pro36 [IsoAsp28] Exendin-4 (1-39),
  des Pro36 [Met (O) 14, Asp28] Exendin-4 (1-39),
  des Pro36 [Met (O) 14, IsoAsp28] Exendin-4 (1-39),
  des Pro36 [Trp (02) 25, Asp28] Exendin-4 (1-39),
  des Pro36 [Trp (02) 25, IsoAsp28] Exendin-4 (1-39),
  des Pro36 [Met (O) 14 Trp (02) 25, Asp28] Exendin-4 (1-39),
  des Pro36 [Met (O) 14 Trp (02) 25, IsoAsp28] Exendin-4 (1-39); or
  des Pro36 [Asp28] Exendin-4 (1-39),
  des Pro36 [IsoAsp28] Exendin-4 (1-39),
  des Pro36 [Met (O) 14, Asp28] Exendin-4 (1-39),
  des Pro36 [Met (O) 14, IsoAsp28] Exendin-4 (1-39),
  des Pro36 [Trp (02) 25, Asp28] Exendin-4 (1-39),
  des Pro36 [Trp (02) 25, IsoAsp28] Exendin-4 (1-39),
  des Pro36 [Met (O) 14 Trp (02) 25, Asp28] Exendin-4 (1-39),
  des Pro36 [Met (O) 14 Trp (02) 25, IsoAsp28] Exendin-4 (1-39),
  wherein the group-Lys6-NH2 may be bound to the C-terminus of the Exendin-4 derivative;
  or an Exendin-4 derivative of the sequence
  des Pro36 Exendin-4 (1-39)-Lys6-NH2 (AVE0010),
  H-(Lys)6-des Pro36 [Asp28] Exendin-4 (1-39)-Lys6-NH2,
  des Asp28 Pro36, Pro37, Pro38Exendin-4 (1-39)-NH2,
  H-(Lys)6-des Pro36, Pro38 [Asp28] Exendin-4 (1-39)-NH2,
  H-Asn-(Glu) 5des Pro36, Pro37, Pro38 [Asp28] Exendin-4 (1-39)-NH2,
  des Pro36, Pro37, Pro38 [Asp28] Exendin-4 (1-39)-(Lys) 6-NH2,
  H-(Lys)6-des Pro36, Pro37, Pro38 [Asp28] Exendin-4 (1-39)-(Lys)6-NH2,
  H-Asn-(Glu) 5-des Pro36, Pro37, Pro38 [Asp28] Exendin-4 (1-39)-(Lys)6-NH2, H-(Lys)6-des Pro36 [Trp (O2) 25, Asp28] Exendin-4 (1-39)-Lys6-NH2, H-des Asp28 Pro36, Pro37, Pro38 [Trp (O2) 25] Exendin-4 (1-39)-NH2, H-(Lys)6-des Pro36, Pro37, Pro38 [Trp (O2) 25, Asp28] Exendin-4 (1-39)-NH2, H-Asn-(Glu) 5-des Pro36, Pro37, Pro38 [Trp (O2) 25, Asp28] Exendin-4 (1-39)-NH2, des Pro36, Pro37, Pro38 [Trp (O2) 25, Asp28] Exendin-4 (1-39)-(Lys)6-NH2, H-(Lys)6-des Pro36, Pro37, Pro38 [Trp (O2) 25, Asp28] Exendin-4 (1-39)-(Lys)6-NH2, H-Asn-(Glu) 5-des Pro36, Pro37, Pro38 [Trp (O2) 25, Asp28] Exendin-4 (1-39)-(Lys)6-NH2, H-(Lys)6-des Pro36 [Met (O) 14, Asp28] Exendin-4 (1-39)-Lys6-NH2, des Met (O) 14 Asp28 Pro36, Pro37, Pro38 Exendin-4 (1-39)-NH2, H-(Lys)6-desPro36, Pro37, Pro38 [Met (O) 14, Asp28] Exendin-4 (1-39)-NH2, H-Asn-(Glu) 5-des Pro36, Pro37, Pro38 [Met (O) 14, Asp28] Exendin-4 (1-39)-NH2, des Pro36, Pro37, Pro38 [Met (O) 14, Asp28] Exendin-4 (1-39)-(Lys)6-NH2, H-(Lys)6-des Pro36, Pro37, Pro38 [Met (O) 14, Asp28] Exendin-4 (1-39)-(Lys)6-NH2, H-Asn-(Glu) 5 des Pro36, Pro37, Pro38 [Met (O) 14, Asp28] Exendin-4 (1-39)-(Lys)6-NH2, H-Lys6-des Pro36 [Met (O) 14, Trp (O2) 25, Asp28] Exendin-4 (1-39)-Lys6-NH2, H-des Asp28 Pro36, Pro37, Pro38 [Met (O) 14, Trp (O2) 25] Exendin-4 (1-39)-NH2, H-(Lys)6-des Pro36, Pro37, Pro38 [Met (O) 14, Asp28] Exendin-4 (1-39)-NH2, H-Asn-(Glu) 5-des Pro36, Pro37, Pro38 [Met (O) 14, Trp (O2) 25, Asp28] Exendin-4 (1-39)-NH2, des Pro36, Pro37, Pro38 [Met (O) 14, Trp (O2) 25, Asp28] Exendin-4 (1-39)-(Lys)6-NH2, H-(Lys)6-des Pro36, Pro37, Pro38 [Met (O) 14, Trp (O2) 25, Asp28] Exendin-4 (S1-39)-(Lys)6-NH2, H-Asn-(Glu) 5-des Pro36, Pro37, Pro38 [Met (O) 14, Trp (O2) 25, Asp28] Exendin-4 (1-39)-(Lys)6-NH2;

or a pharmaceutically acceptable salt or solvate of any one of the afore-mentioned Exendin-4 derivative.

Hormones are for example hypophysis hormones or hypothalamus hormones or regulatory active peptides and their antagonists as listed in Rote Liste, ed. 2008, Chapter 50, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, Goserelin.

A polysaccharide is for example a glucosaminoglycane, a hyaluronic acid, a heparin, a low molecular weight heparin or an ultra low molecular weight heparin or a derivative thereof, or a sulphated, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium.

Antibodies are globular plasma proteins (~150 kDa) that are also known as immunoglobulins which share a basic structure. As they have sugar chains added to amino acid residues, they are glycoproteins. The basic functional unit of each antibody is an immunoglobulin (Ig) monomer (containing only one Ig unit); secreted antibodies can also be dimeric with two Ig units as with IgA, tetrameric with four Ig units like teleost fish IgM, or pentameric with five Ig units, like mammalian IgM.

The Ig monomer is a "Y"-shaped molecule that consists of four polypeptide chains; two identical heavy chains and two identical light chains connected by disulfide bonds between cysteine residues. Each heavy chain is about 440 amino acids long; each light chain is about 220 amino acids long. Heavy and light chains each contain intrachain disulfide bonds which stabilize their folding. Each chain is composed of structural domains called Ig domains. These domains contain about 70-110 amino acids and are classified into different categories (for example, variable or V, and constant or C) according to their size and function. They have a characteristic immunoglobulin fold in which two β sheets create a "sandwich" shape, held together by interactions between conserved cysteines and other charged amino acids.

There are five types of mammalian Ig heavy chain denoted by α, δ, ε, γ, and μ. The type of heavy chain present defines the isotype of antibody; these chains are found in IgA, IgD, IgE, IgG, and IgM antibodies, respectively.

Distinct heavy chains differ in size and composition; α and γ contain approximately 450 amino acids and δ approximately 500 amino acids, while μ and ε have approximately 550 amino acids. Each heavy chain has two regions, the constant region (CH) and the variable region (VH). In one species, the constant region is essentially identical in all antibodies of the same isotype, but differs in antibodies of different isotypes. Heavy chains γ, α and δ have a constant region composed of three tandem Ig domains, and a hinge region for added flexibility; heavy chains μ and ε have a constant region composed of four immunoglobulin domains. The variable region of the heavy chain differs in antibodies produced by different B cells, but is the same for all antibodies produced by a single B cell or B cell clone. The variable region of each heavy chain is approximately 110 amino acids long and is composed of a single Ig domain.

In mammals, there are two types of immunoglobulin light chain denoted by λ and κ. A light chain has two successive domains: one constant domain (CL) and one variable domain (VL). The approximate length of a light chain is 211 to 217 amino acids. Each antibody contains two light chains that are always identical; only one type of light chain, κ or λ, is present per antibody in mammals.

Although the general structure of all antibodies is very similar, the unique property of a given antibody is determined by the variable (V) regions, as detailed above. More specifically, variable loops, three each the light (VL) and three on the heavy (VH) chain, are responsible for binding to the antigen, i.e. for its antigen specificity. These loops are referred to as the Complementarity Determining Regions (CDRs). Because CDRs from both VH and VL domains contribute to the antigen-binding site, it is the combination of the heavy and the light chains, and not either alone, that determines the final antigen specificity.

An "antibody fragment" contains at least one antigen binding fragment as defined above, and exhibits essentially the same function and specificity as the complete antibody of which the fragment is derived from. Limited proteolytic digestion with papain cleaves the Ig prototype into three fragments. Two identical amino terminal fragments, each containing one entire L chain and about half an H chain, are the antigen binding fragments (Fab). The third fragment, similar in size but containing the carboxyl terminal half of both heavy chains with their interchain disulfide bond, is the crystalizable fragment (Fc). The Fc contains carbohydrates, complement-binding, and FcR-binding sites. Limited pepsin digestion yields a single F(ab')$_2$ fragment containing both Fab pieces and the hinge region, including the H—H interchain disulfide bond. F(ab')$_2$ is divalent for antigen binding. The disulfide bond of F(ab')$_2$ may be cleaved in order to obtain Fab'. Moreover, the variable regions of the heavy and light chains can be fused together to form a single chain variable fragment (scFv).

Pharmaceutically acceptable salts are for example acid addition salts and basic salts. Acid addition salts are e.g. HCl or HBr salts. Basic salts are e.g. salts having a cation selected from alkali or alkaline, e.g. Na+, or K+, or Ca2+, or an ammonium ion N+(R1)(R2)(R3)(R4), wherein R1 to R4 independently of each other mean: hydrogen, an optionally substituted C1-C6-alkyl group, an optionally substituted C2-C6-alkenyl group, an optionally substituted C6-C10-aryl group, or an optionally substituted C6-C10-heteroaryl group. Further examples of pharmaceutically acceptable salts are described in "Remington's Pharmaceutical Sciences" 17. ed. Alfonso R. Gennaro (Ed.), Mark Publishing Company, Easton, Pa., U.S.A., 1985 and in Encyclopedia of Pharmaceutical Technology.

Pharmaceutically acceptable solvates are for example hydrates.

BRIEF DESCRIPTION OF THE FIGURES

Non-limiting, exemplary embodiments of the invention will now be described with reference to the accompanying drawings, in which.

DETAILED DESCRIPTION

Figure 1:
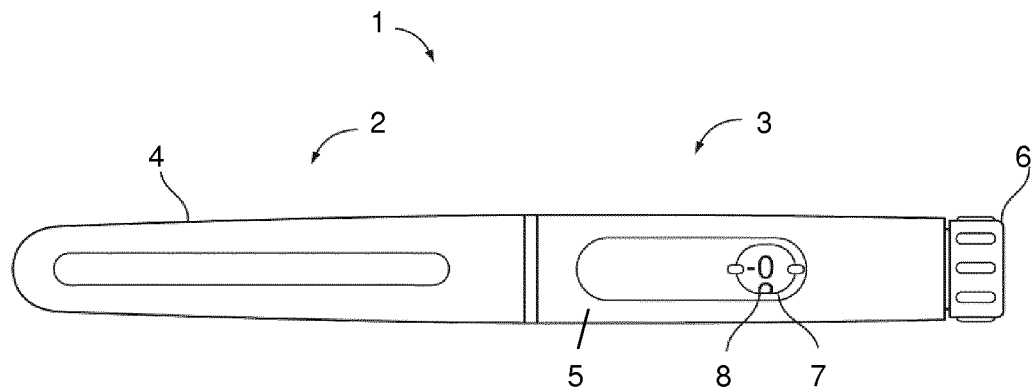
FIG. 1 shows a drug delivery device with a dose setting mechanism in accordance with one aspect of the present disclosure.

Referring to FIG. 1, there is shown a drug delivery device 1 in accordance with an exemplary arrangement. The drug delivery device 1 comprises a distally arranged cartridge retaining part 2 and a proximally arranged dose setting mechanism 3. The drug delivery device may be a resettable drug delivery device (i.e., a reusable device) or alternatively a non-resettable drug delivery device (i.e., a non-reusable device). The cartridge retaining part 2 and the dose setting mechanism 3 are secured together by connecting features. For non-resettable devices, these connecting features would be permanent and non-reversible. For resettable devices, these connecting features would be releasable.

In this illustrated arrangement, the cartridge retaining part 2 is secured within the dose setting mechanism 3. A removable cap 4 is releasably retained over the cartridge retaining part 2. The dose setting mechanism 3 is encased by an outer housing 5 and comprises a dose dial grip 6 and a window or lens 7. A dose scale arrangement 8 is viewable through the window or lens 7.

Figure 2:
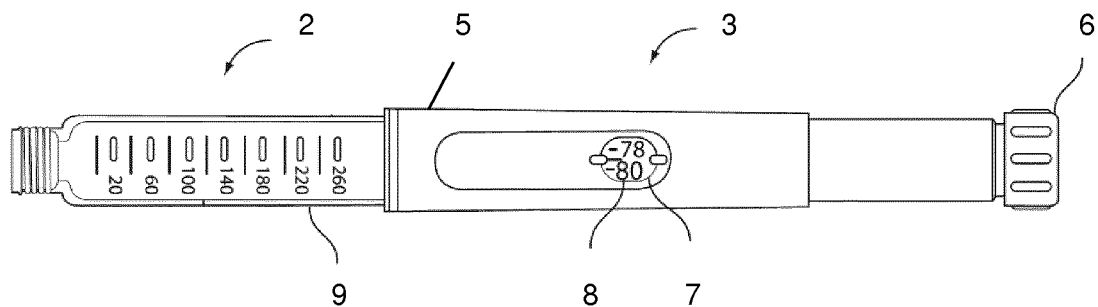
FIG. 2 shows the drug delivery device of FIG. 1 with a cap removed and showing a cartridge holder.

To set a dose of medication contained within the drug delivery device 1, a user rotates the dose dial grip 6 relative to the outer housing 5 such that a dialed dose will become viewable in the window or lens 7 by way of the dose scale arrangement 8. Dose setting may involve a proximal movement of the dose dial grip 6 with respect to the outer housing 5 as shown in FIG. 2. Dose dispensing may involve pushing the dose dial grip back in the distal direction.

FIG. 2 illustrates the drug delivery device 1 of FIG. 1 with the cover cap 4 removed from a distal end of the device 1. This removal exposes a cartridge holder 9. A cartridge (not shown) from which a number of doses of a medicinal product may be dispensed, is provided in the cartridge holder 9. The cartridge comprises a bung or stopper (not illustrated in FIG. 2) that is retained near a proximal end of the cartridge.

Figure 3:
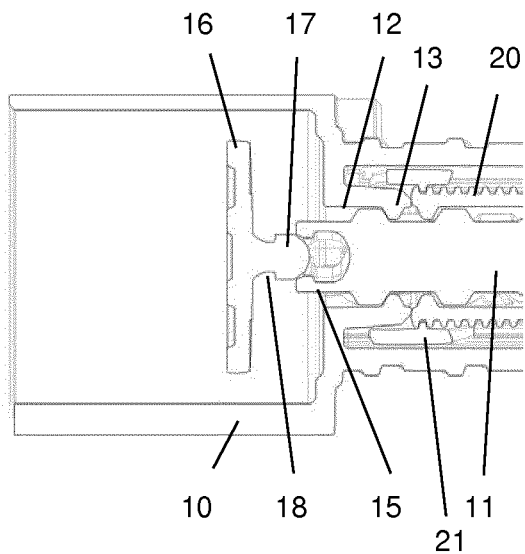
FIG. 3 shows a sectional view of an embodiment of the drug delivery device according to the disclosure prior to assembly of a bearing.

The drug delivery device, in particular the dose setting mechanism 3, may also comprise an inner housing 10 or insert which may be a separate component part as depicted in FIG. 3 or may be an integral component part of the outer housing 5. The drug delivery device further comprises a piston rod 11 or a spindle having a distal end facing towards the cartridge retaining part 2 and an opposite proximal end.

In the embodiment depicted in FIG. 3, the inner housing 10 is provided with a central opening 12 receiving of the piston rod 11. As an alternative to the depicted embodiment, the opening 12 may be provided directly in the outer housing 5. The opening 12 is provided with an inner thread 13 interacting with an outer thread 14 of the piston rod 11. Thus, rotation of the piston rod 11 with respect to the inner housing 10 results in an axial displacement of the piston rod 11 with respect to the inner housing 10. The distal end of the piston rod 11 is provided with a female snap feature, for example comprising two flexible hooks 15. The hooks 15 are designed such that they can be elastically deformed in a radial direction, thereby widening the female snap feature.

Figure 4:
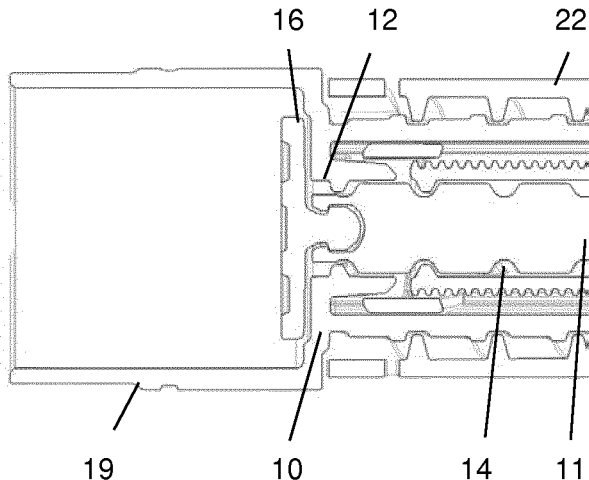
FIG. 4 shows a sectional view of the embodiment of FIG. 1 after assembly of the bearing.

The dimensions of the central opening 12 with its inner thread 13 and to the flexible hooks 15 are chosen such that the central opening 12 and the inner thread 13 do not interfere with the flexible hooks 15 in the unstressed (at rest) condition of the hooks as depicted in FIGS. 3 and 4. However, the central opening 12 with its inner thread 13 substantially prevents widening of the flexible hooks 15 in the radial direction. The at least one flexible hook 15 constitutes a first attachment element.

The drug delivery device further comprises a bearing 16 which is depicted in FIG. 3 prior to attachment on the piston rod 11. The bearing 16 is substantially disc-shaped and comprises a spigot 17 or stem extending in the proximal direction. The spigot 17 is provided with an annular recess 18 or groove arranged between the proximal end of the spigot 17 and the disc-shaped portion of the bearing 16. The spigot 17 with its recess 18 constitutes a second attachment element. The dimensions of the spigot 17 and the recess 18 are adapted to the dimensions of the female snap features, i.e. the flexible hooks 15, of the piston rod 11 such that the bearing 16 can be attached to the distal end of the piston rod 11 by a snap engagement of the spigot 17 into the flexible hooks 15.

As an alternative to the embodiments depicted in FIGS. 3 and 4 the spigot with the recess may be provided on the piston rod 11 and the female snap features may be provided on the bearing 16.

FIGS. 3 and 4 illustrate two steps during assembly of the drug delivery device 1, especially attachment of the bearing 16 on the piston rod 11. FIG. 3 shows the piston rod 11 advanced through the thread 13 of the inner housing 10 into a distal mounting position and ready to clip to the bearing 16. To clip the piston rod 11 into the bearing 16, either the bearing can be pushed to the right (as seen in FIG. 3), or the piston rod 11 can be advanced by rotating it though the threaded aperture in the inner housing 10 by an amount equal to that required to fully assemble the snap connection.

In FIG. 4, the piston rod 11 has been clipped into the bearing and then the piston rod 11 rotated backwards so that it moves to the right (as seen in FIG. 4) axially and pulls the bearing 16 back into the region of the thread form 13 of the inner housing 10. This retraction of the piston rod 11 serves to lock the snaps (hooks 15) from deflection radially outwards and therefore prevents the bearing 16 from becoming detached without considerable force being applied.

In the example depicted in the Figures, the inner housing 10 is provided with a substantially cylindrical coupling portion 19 extending in the distal direction with respect to the opening 12. The coupling portion 19 may be adapted for rigidly constraining the inner housing 10 to the outer housing 5.

In the exemplary embodiment of FIGS. 3 and 4 the drug delivery device further comprises driver 20 interacting with the piston rod 11, e.g. by means of a splined engagement. The driver may be provided with an external thread engaging a nut 21 which may limit the maximum amount of drug which may be dispensed from the drug delivery device 1. FIGS. 3 and 4 further show a portion of the dose setting sleeve 22 which may be an integral portion of the dose dial grip 6 and/or the dose scale arrangement 8. As an alternative, the dose setting sleeve 22 may be coupled to the dose dial grip 6 and/or the dose scale arrangement 8 and or the driver 20.

For example, dose setting may involve rotation of the dose setting sleeve 22 in a first direction via the dose dial grip 6. This rotation may be a rotation relative to the outer housing 5 and the inner housing 10 and/or a rotation relative to the driver 20.

Dose dispensing may involve rotating the dose setting sleeve 22 in a second direction which is opposite to the first direction. During dose dispensing the driver 20 may be rotationally coupled to the dose setting sleeve 22. Rotation of the driver 20 may be transferred to the piston rod 11 which due to the threaded engagement with the inner housing 10 moves in the distal direction upon rotation. This distal movement of the piston rod 11 with the bearing 16 may push the bung in the cartridge in the distal direction for dispensing a dose of the medicament.

As an alternative, rotating the dose setting sleeve 22 during dose dispensing may involve an axial or helical movement of the driver 20 which may be transferred via a threaded interface to the piston rod 11. This may result in a pure axial or a combined axial and rotational movement of the piston rod 11 with the bearing 16 to push the bung in the cartridge in the distal direction for dispensing a dose of the medicament.

REFERENCE NUMERALS 1 drug delivery device
2 cartridge holder
3 housing
4 dose setting mechanism
5 cap
6 dose dial grip
7 window/lens
8 dose scale arrangement
9 cartridge holder
10 inner housing
11 piston rod
12 opening
13 inner thread
14 outer thread
15 hook/female snap feature (first attachment element)
16 bearing
17 spigot (second attachment element)
18 recess
19 coupling portion
20 driver
21 nut
22 dose setting sleeve

The invention claimed is:

1. A drug delivery device comprising:
a housing with an opening;
a piston rod having a proximal end and a distal end, wherein at least a portion of the piston rod has a first interface adapted to engage the opening to guide the piston rod during a distal movement or a proximal movement of the piston rod relative to the housing, and wherein the piston rod includes at least one first attachment element located at the distal end; and
a bearing with at least one second attachment element configured to rotatably attach to the distal end of the piston rod,
wherein the at least one first attachment element and/or the at least one second attachment element is elastically deformable in a radial direction for a snap engagement of the piston rod and the bearing,
wherein the opening comprises at least one portion having a contour adapted to
receive the at least one first attachment element and the at least one second attachment element when attached to each other, and
prevent disengagement of the at least one first attachment element and the at least one second attachment element when received in the opening;
wherein the piston rod is configured to be retracted in a proximal direction until the at least one first attachment element and the at least one second attachment element are at least partially received in the opening of the housing, and
wherein the contour of the opening is adapted to receive the at least one first attachment element and the at least one second attachment element with a clearance fit or an interference fit permitting axial movement of the bearing and the piston rod when attached to each other and blocking an elastic deformation of at least one of the first attachment element or the second attachment element, wherein the elastic deformation is required for disengagement of the at least one first attachment element and the at least one second attachment element when received in the opening.

2. The drug delivery device according to claim 1, wherein, during an assembly of the drug delivery device, the piston rod is axially movable between (i) a distal mounting position in which the at least one first attachment element and the at least one second attachment element are located distally from the opening, and (ii) a proximal transport position in which the at least one first attachment element and the at least one second attachment element are received in the opening.

3. The drug delivery device according to claim 1, wherein the opening is provided with an internal thread, and wherein the first interface of the piston rod comprises an external thread.

4. The drug delivery device according to claim 3, wherein the at least one portion of the opening that has the contour comprises the internal thread.

5. A drug delivery device comprising:
a housing with an opening;
a piston rod having a proximal end and a distal end, wherein at least a portion of the piston rod has a first interface adapted to engage the opening to guide the piston rod during a distal movement or a proximal movement of the piston rod relative to the housing, and wherein the piston rod includes at least one first attachment element located at the distal end; and
a bearing with at least one second attachment element configured to rotatably attach to the distal end of the piston rod,
wherein the at least one first attachment element and/or the at least one second attachment element is elastically deformable in a radial direction for a snap engagement of the piston rod and the bearing,
wherein the opening comprises at least one portion having a contour adapted to
receive the at least one first attachment element and the at least one second attachment element when attached to each other, and
prevent disengagement of the at least one first attachment element and the at least one second attachment element when received in the opening;
wherein the piston rod is configured to be retracted in a proximal direction until the at least one first attachment element and the at least one second attachment element are at least partially received in the opening of the housing, and
wherein the opening is provided with a non-circular cross-section, and wherein the first interface of the piston rod comprises a corresponding non-circular cross-section.

6. The drug delivery device according to claim 5, wherein the at least one portion of the opening that has the contour comprises a protrusion.

7. The drug delivery device according to claim 1, wherein the bearing comprises a disc configured to abut a bung of a cartridge, and wherein the at least one second attachment element comprises a spigot extending proximally from a proximal side of the disc, wherein the spigot comprises at least one radial recess.

8. The drug delivery device according to claim 7, wherein the at least one first attachment element of the piston rod comprises at least one snap hook adapted to engage with the at least one radial recess of the bearing.

9. The drug delivery device according to claim 1, wherein the at least one first attachment element of the piston rod comprises a spigot at the distal end, wherein the spigot comprises at least one radial recess.

10. The drug delivery device according to claim 9, wherein the bearing comprises a disc to abut a bung of a cartridge, and the at least one second attachment element comprises at least one snap hook extending proximally from a proximal side of the disc and adapted to engage with the at least one radial recess of the spigot.

11. The drug delivery device according to claim 1, further comprising a drive member operatively coupled to the piston rod to displace the piston rod in a distal direction.

12. The drug delivery device according to claim 1, further comprising a dose setting member operatively coupled to the housing for selecting a dose.

13. The drug delivery device according to claim 1, further comprising a cartridge holder attached to the housing and containing a cartridge that contains a medicament.

14. An assembly method for a drug delivery device, the device comprising at least a housing with an opening, a piston rod having a proximal end and a distal end and at least one first attachment element located at the distal end, and a bearing with at least one second attachment element for a rotatable attachment of the bearing at the distal end of the piston rod, the method comprising:
introducing the piston rod into the housing such that the distal end of the piston rod distally protrudes through the opening;
attaching the bearing on the piston rod by a snap engagement of the at least one first attachment element and the at least one second attachment element; and
retracting the piston rod in a proximal direction until the at least one first attachment element and the at least one second attachment element are at least partially received in the opening of the housing such that the opening prevents disengagement of the at least one first attachment element and the at least one second attachment element,
wherein when the at least one first attachment element and the at least one second attachment element are at least partially received in the opening of the housing, a contour of the opening receives the at least one first attachment element and the at least one second attachment element with a clearance fit or an interference fit permitting axial movement of the bearing and the piston rod when attached to each other and blocking an elastic deformation of at least one of the first attachment element or the second attachment element, wherein the elastic deformation is required for disengagement of the at least one first attachment element and the at least one second attachment element when received in the opening.

15. The assembly method according to claim 14, wherein at least one of (i) introducing the piston rod into the housing or (ii) retracting the piston rod in the proximal direction involves a rotation and a translation of the piston rod.

16. The assembly method according to claim 14, wherein attaching the bearing on the piston rod involves elastically deforming the at least one first attachment element or the at least one second attachment element in a radial direction.

17. The assembly method according to claim 14, further comprising attaching a cartridge holder containing a cartridge that contains a medicament to the housing such that the bearing abuts a bung in the cartridge.

18. The assembly method according to claim 14, attaching the bearing to the piston rod comprises engaging at least one snap hook of the at least one first attachment element with at least one radial recess in the bearing,
wherein the bearing comprises a disc and the at least one second attachment element comprises a spigot extending proximally from a proximal side of the disc, and wherein the spigot comprises the at least one radial recess.

* * * * *